United States Patent
George

(10) Patent No.: US 6,965,600 B2
(45) Date of Patent: Nov. 15, 2005

(54) LOW SPEED MODEM TRANSMISSION OVER PACKET NETWORKS

(75) Inventor: Edward N. George, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 831 days.

(21) Appl. No.: 09/750,140

(22) Filed: Dec. 29, 2000

(65) Prior Publication Data

US 2002/0085558 A1 Jul. 4, 2002

(51) Int. Cl.⁷ .................... H04L 12/56; H04L 12/28
(52) U.S. Cl. ............... 370/392; 370/282; 370/293; 370/395.52; 370/466; 370/467; 375/222
(58) Field of Search .................. 370/392, 393, 370/401, 420, 421, 474, 492, 493, 395.52, 466, 467, 522, 537, 228, 230, 244, 352, 370, 463, 220, 449, 256, 278, 354, 410, 503; 375/222, 326; 379/93.08, 418, 100.7; 709/203

(56) References Cited

U.S. PATENT DOCUMENTS

| | | | | |
|---|---|---|---|---|
| 4,569,062 A | * | 2/1986 | Dellande et al. ............ 375/370 |
| 5,267,263 A | * | 11/1993 | Feezel et al. ............... 375/220 |
| 5,592,538 A | * | 1/1997 | Kosowsky et al. ...... 379/93.08 |
| 5,625,677 A | * | 4/1997 | Feiertag et al. ............ 370/493 |
| 5,627,829 A | * | 5/1997 | Gleeson et al. ............ 370/230 |
| 5,673,252 A | * | 9/1997 | Johnson et al. ............ 370/449 |
| 5,790,641 A | | 8/1998 | Chan et al. |
| 5,822,524 A | * | 10/1998 | Chen et al. ................. 709/203 |
| 5,831,561 A | * | 11/1998 | Cai et al. .................... 341/106 |
| 5,912,896 A | * | 6/1999 | Beighe et al. .............. 370/463 |
| 6,016,425 A | * | 1/2000 | Bannister ................. 455/432.1 |
| 6,023,470 A | | 2/2000 | Lee et al. |
| 6,108,706 A | * | 8/2000 | Birdwell et al. ............ 709/229 |
| 6,347,075 B1 | * | 2/2002 | Barzegar et al. ............ 370/228 |
| 6,434,169 B1 | * | 8/2002 | Verreault ..................... 370/522 |
| 6,459,708 B1 | * | 10/2002 | Cox et al. .................... 370/537 |
| 6,504,838 B1 | * | 1/2003 | Kwan ......................... 370/352 |
| 6,628,625 B1 | * | 9/2003 | Birdwell et al. ............ 370/270 |
| 6,654,348 B1 | * | 11/2003 | Doty, II et al. ............. 370/244 |
| 6,667,986 B1 | * | 12/2003 | Sullivan et al. ............. 370/420 |
| 6,728,753 B1 | * | 4/2004 | Parasnis et al. ............. 709/203 |
| 2002/0162047 A1 | * | 10/2002 | Peters et al. ................... 714/5 |

FOREIGN PATENT DOCUMENTS

EP    1 047 231 A    10/2000

OTHER PUBLICATIONS

Procedures for Real–Time Group 3 Facsimile Communication Over IP Networks, ITU–T Recommendation T.38, Jun. 1998 pp. 1–30, (International Telecommunication Union).

* cited by examiner

*Primary Examiner*—Phirin Sam
*Assistant Examiner*—Anthony Ton
(74) *Attorney, Agent, or Firm*—Abdul Zindani; Wade James Brady, III; Frederick J. Telecky, Jr.

(57) ABSTRACT

A modem relay provides a local interface to the a modem on both ends of a call, demodulates the full duplex data stream, packetizes the bits for transport over an IP network, and remodulates the data stream at the remote end. The modem relay negotiates a best supported rate and modulation. If no common rate and modulation is supported by the modems at each end of the communication, the modem relay components will establish independent connections to the modems at each end and transmit information across the packet network. The modem data stream can also be transported in a redundant fashion, which allows for seamless error recovery in the event of single or double packet loss events. Since the data stream can be completely recovered after packet loss, the remote modem is able to recreate the local modem's transmission exactly.

17 Claims, 6 Drawing Sheets

LOW SPEED MODEM TRANSMISSION OVER PACKET NETWORKS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to modem transmission over packet networks. In particular, the present invention relates to techniques for demodulating, relaying, and remodulating low speed (eg. V.22, V.22bis and V.21) modem transmissions over packet networks.

When modem devices are connected through a packet network, they are not directly connected. The entire modem signal is packetized at the sending end, sent over the packet network and reassembled into a designated format at the receiving end before presentation to the receiving modem device.

For example, packetizing and transportation of modem calls over gateway platforms using G.711 (PCM) codec, requires digitizing the originating modem phone line at 64 Kbps, packetizing and transporting the entire 64 kbps data stream to the other side, and then sending out the same 64 kbps data stream to the remote modem. The advantage of this approach is that it works for any modem that can be received on a standard POTS phone line, and it is simple to implement.

The disadvantage of this approach are:

(1) it requires a large amount of network bandwidth to implement the call and a connection can be dropped because of packet loss. If G.711 packets are being sent every 10 mSec, then the network bandwidth required to send each direction of the call is over 110 kbps (when the header sizes (RTP+UDP+IP+TCP+Ethernet) are included).

(2) The connection over a packet network is not a constant connection and often experiences line delays, errors, jitter and/or packet loss which can result in modem errors. In particular, packet loss results in interruptions in the modem signal (intermittent carrier loss) at the receiving modem. The interruptions result in degraded data throughput due to modem retrains and increased modem connection failures.

(3) Due to the clock differences at the two end points, standard G.711 playout techniques will periodically exhibit a modem signal interruption due to playout overruns and/or underruns. Again these interruptions in the modem signal lead to periodic modem retrains impacting data throughput rates.

In summary, when G.711 coding with packetization is used for data modem transmissions, the two modems are essentially communicating to each other using a potentially inadequate medium for their transmission. This approach is particularly vulnerable to network packet loss.

SUMMARY OF THE INVENTION

The modem relay of the present invention allows for the capability to demodulate, relay, and remodulate modem transmissions over packet networks.

The modem relay provides a local interface to the modem on both ends of the call, demodulates the full duplex data stream, packetizes the bits for transport over an IP network, and remodulates the data stream at the remote end. The modem relay provides bandwidth savings, and improved performance (data throughput and connection reliability) in a packet loss environment.

The modem relay mitigates the problems associated with using G.711 to send modem traffic. In modem relay, the physical layer or link layer of the modem signal is terminated locally for both ends of the call. Only the demodulated data stream is sent over the network. This leads to dramatic bandwidth savings. For a V.34 modem, in an exemplary embodiment, the 64 kbps phone line is demodulated into a maximum of 33,600 bps data stream. That data stream is packetized and transported with a network bandwidth of less than 20 kbps (for 30 mSec packets).

Since the physical layer is terminated locally, network packet loss will not result in any interruption in the modem signal at the receiving modem. Therefore this approach will eliminate connection failures due to the network packet loss. Instead a packet loss will result in an error in the information data stream.

Bandwidth savings are also realized using Modem Relay in that data is carried over the IP network only as the modem transmits data. When the modem is not transmitting data, no packets are sent on the IP network. In contrast, continuous 64 kbps packetization takes place when using G.711 to carry modem traffic. Depending on the network transport, the modem data is sent over the packet network using a guaranteed delivery mechanism (link layer termination) or sent using a non-guaranteed delivery mechanism (physical layer termination). In the case of a non-guaranteed delivery mechanism, data redundancy techniques can be used to combat packet loss and improve data throughput.

DETAILED DESCRIPTION OF THE INVENTION

The modem relay for V.22bis modems and below occurs at the physical layer. The modem's physical layer is demodulated into a bitstream and that bitstream is relayed end-to-end across the network. Any higher layer protocols (error correction, compensation) that may be present are passed end-to-end across the network.

Figure 1:
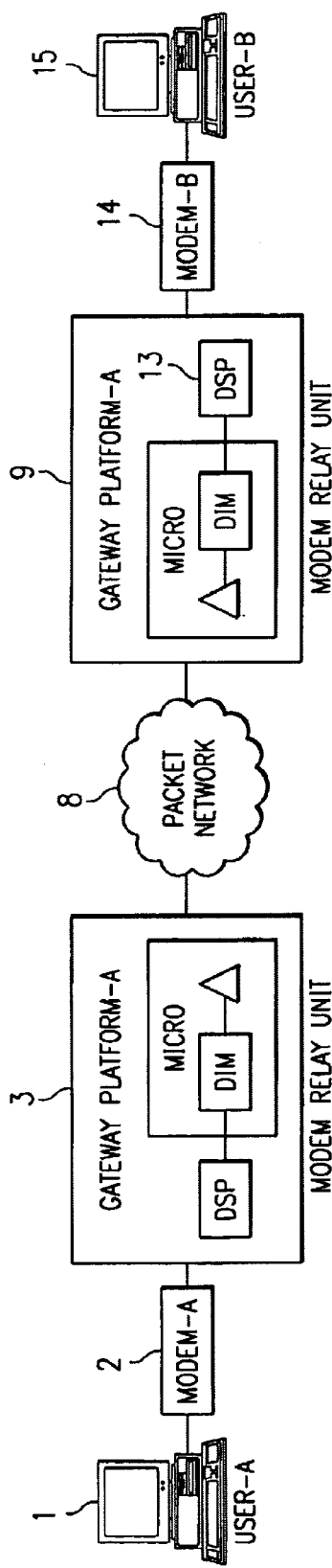
FIG. 1 is a diagram illustrating the components of a modem relay configuration.
Figure 2:
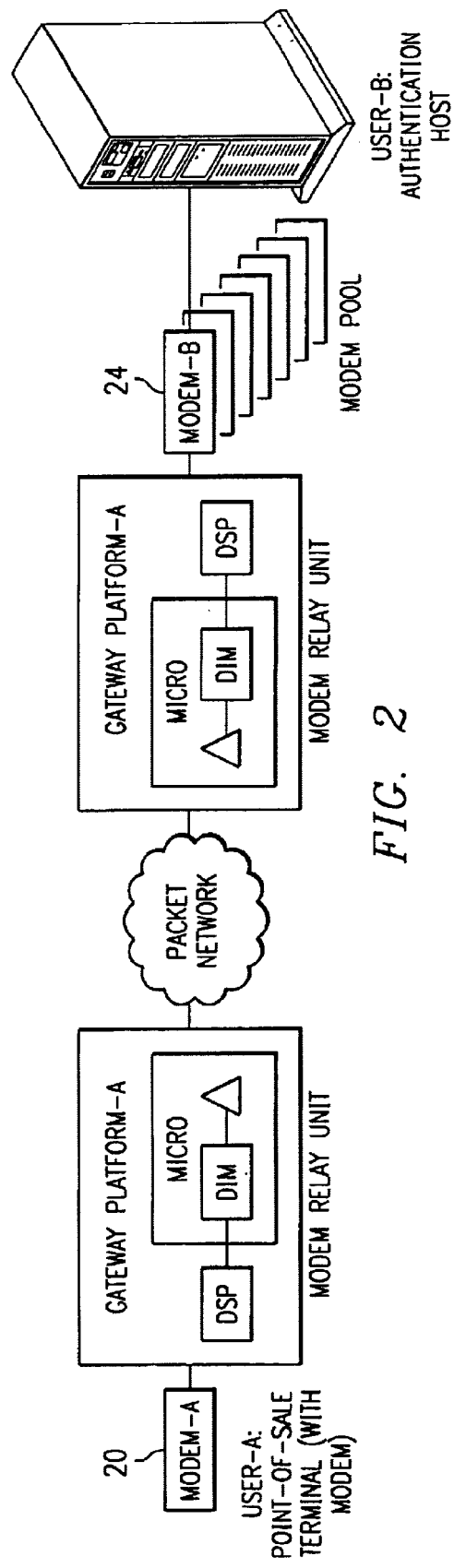
FIG. 2 is a diagram illustrating a point-of-sale implementation of the present invention.

A typical modem relay system configuration is illustrated in FIG. 1. For lower speed modems, a typical end-user application is in point-of-sale terminals used to implement credit card validation. FIG. 2 illustrates a point-of-sale implementation using modem relay.

The steps in setting up a modem relay connection are:

1) A first user, initiates a modem call using a dial-up modem, such as modem 2 attached to a personal computer 1 or in a point-of-sale terminal 20, at the first end of the connection.

2) Modem 2, enters an off-hook state, dials and waits for the far end modem 14 to answer.

3) The first gateway 3 detects the line seizure, opens a DSP voice channel and collects DTMF digits.

4) The first gateway 3 translates the dial number and attempts to perform a call setup to the far end gateway 9 which is located at a remote point in the network.

5) Gateway 9 detects the incoming call setup from gateway 3 over the packet network 8. The gateway 9 accepts the incoming call and opens a DSP voice channel to handle the incoming call. Next, gateway 9 seizes the outgoing line.

6) For modem relay, the outgoing line connects to modem 14 at the far end which may be connected to a personal computer 15 or may be a modem in a modem pool 24. Modem 14 goes off-hook and plays a modem answer sequence (eg. V.25 ANS tone).

7) Gateway 3 detects the modems answer sequence (as described below) and switches the DSP over from a voice channel to a modem relay channel. Then gateway 9 sends the switch over message to gateway 3 in the form of a modem relay message packet. Gateway 9 also continues to negotiate with far end modem 14 to establish a data connection to PC 15.

8) Gateway 3 switches its channel to modem relay and begins to negotiate channel setup with modem 2.

9) During the negotiations, control messages are exchanged between gateway 3 and gateway 9 to coordinate the compression format used on both sides of the link and to establish the gateway to gateway LAPM link. At the end of the negotiation, both modems have connected with their respective local gateway at the best possible connection rate using V.42 LAPM and the same type of compression. Further, the modems on both sides have transitioned into data mode and are ready to begin sending or receiving data.

10) Modem 2 and modem 14 now begin sending data back and forth across the packet network 8. Each gateway unit demodulates the modem transmissions, packetizes the data and sends it to the far side. The gateway on the far side remodulates the modem data and sends it to the far end modem. Throughout the connection, flow control is performed on each segment of the link to regulate the error free transmission of data.

11) The connection continues until one of the modems hangs up. At that point, the call is terminated on both sides and the channels then return to idle.

Throughout a modem relay call, the state machines in the modem relay unit periodically send line status updates to make sure that both modems remained in sync with each other.

Figure 3:
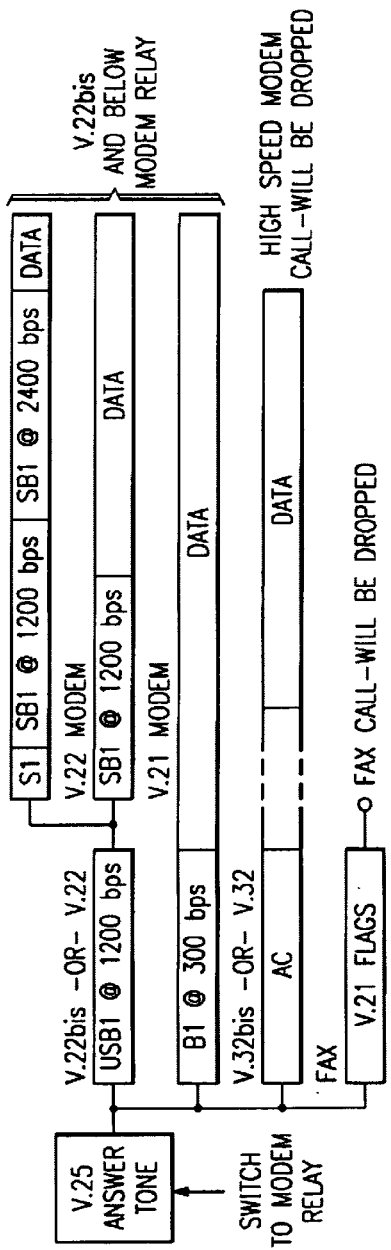
FIG. 3 is a flow decision diagram illustrating the decision sequence for determining the modulation and connection speed.

The operation of modem relay is driven by events that occur when gateway 9 seizes its outgoing line and places a call to modem 14. Initially gateway 9 does not know that the call is a modem call, and begins by using a voice processing configuration in the DSP 13. When modem 14 answers, it begins play out of a V.25 answered tone (ANS), as illustrated in FIG. 3.

When modem relay is enabled, gateway 9 switches to the low speed modem relay DSP code after it detects the V.25 answered tone, and proceeds to monitor the incoming sequence from modem 14. Gateway 9 attempts to establish a V.22bis, V.22 or V.21 data connection. Depending on the type of modem on the line, the decision sequence illustrated in FIG. 3 is executed to determine the modulation and speed for the connection. If a fax signal is detected, the modem relay code sends a message to the microprocessor code to perform a switch to fax relay.

At each stage of the negotiation process, gateway 9 will be sending signaling messages across the network to gateway 3. Because there is no guaranteed method of flow control between lower speed modems, both sides of the connection must be trained to operate at the same modulation and rate. Therefore, signaling messages are used to determine if the capabilities of the two modems can support an optimal connection. If there is a capability overlap, the best commonly supported data rate will be selected at both sides. If there is no modulation and rate common to modem 2 and modem 14, then the call will be a connected independently at both sides. These "uneven" connections work, but not as efficiently as connections that support the same data rate at both ends.

For V.32 modems and above, V.42 error correction is frequently used to provide link layer connectivity and error correction between the two modem and points. For V.22bis modems and below, V.42 error correction may or may not be present in the connection.

For V.22bis modems and below, if V.42 is present, it is handled transparently by passing error correction end-to-end over the network. Therefore, both modems have to be synchronized at the start of the call to use the same modulation and data rate. Then, V.42 and other high layer protocols are simply ignored by the modem relay software. This approach will work provided that network end-to-end delays do not exceed one second. If the network delay exceeds one second, then the modems will be able to connect to each other but not be able to establish LAPM protocols across the link, which will increase the error rate and prevent data compression (V.42 bis) for the modem session.

There is currently no network protocol standard defining the call control or data transmission protocol for modem relay over packet networks. Therefore, a proprietary approach is utilized by the present invention to implement modem relay. However, the present invention can be implemented with a standard protocol without departing from the scope of the inventive concepts taught herein. The protocol is similar to the proprietary fax relay protocol disclosed in co-pending application Ser. No. 09/031,047. The modem relay protocol used accommodates encapsulation using the RTP format for transmission across the network.

The modem relay protocol has the following features:

Redundant Signaling Messages—There are two types of signaling messages: call control and modem control signaling. Once a modem call is established, the only call control message that is expected is a termination event. Modem control messages including events like forced retraining or carrier loss events. All of the signaling messages between the two gateway units 3 and 9, are sent periodically throughout the call by the modem relay unit. They are sent more rapidly during call setup and negotiation. A signaling message is contained in a single modem relay packet, which conveys the current state of the call. If the network drops any one signaling packet, another packet will be sent soon so that the call can still proceed normally. If there is a network outage during a modem call that interrupt the packet flow between modem relay units, each side of the connection will perform a clear down on its part of the call.

Redundant data. Instead of sending the same packet several times, data redundancy is achieved by appending old data from previous packets (along with their associated packet sequence numbers) in the payload section of the current data packet. The current payload now contains both current and redundant packet data. Then, the receiving gateway uses the current packet sequence number to determine if there has been a packet loss. If no packet loss has occurred, it uses the data associated with the most recent (i.e., the current) data field (as identified by packet sequence number) in the packet. If the receiving gateway detects that packet loss has occurred, the data for the lost packets are retrieved by reading further down in the current packet's payload until the data fields of lost packets (as identified by their packet sequence numbers) are found. Then the data contained in those data fields are read by the gateway. Data redundancy effectively increases the network bandwidth, though the actual data from the modem is a small part of the overall packet size. For instance, in a 2400 bps modem with a 10 msec VIF size, the data size is 3 bytes and the header size is 48 bytes per network packet. Adding in additional 3 byte data fields will not increase the overall packet size by a significant amount based on a percentage of the total size. The amount of redundant data fields contained in each packet is configurable.

Retraining is also accommodated by the present invention. In the event that one of the modems in the connection experiences a loss of equalization on the line, it can initiate a retrain signal. When a gateway receives the retrain signal, it executes the retraining sequence locally and sends the retrain signal across the network to the other gateway. Both sides of the connection are negotiated to support the best case common rate.

Since the retraining and rate signaling events may not be supported by one of the modems in the connection, a potential system problem occurs when one side initiates a retrain. The significance of this problem will depend upon the modem capabilities. If both sides of the call cannot be read trained to the compatible rate, the call will be terminated and cleared.

Call discrimination is accomplished through processing in the DSP. When a call is connected, the gateway must determine what type of call processing is required to successfully implement the call: voice, fax relay, modem relay, or PCM. Individual channels can be pre-configured for a certain type of processing, but in general the gateway does not know in advance what type of devices are going to be involved in the call. The earlier it can distinguish the type of traffic involved in a call, the faster it can switch over to use the right set of processing resources.

Figure 4:
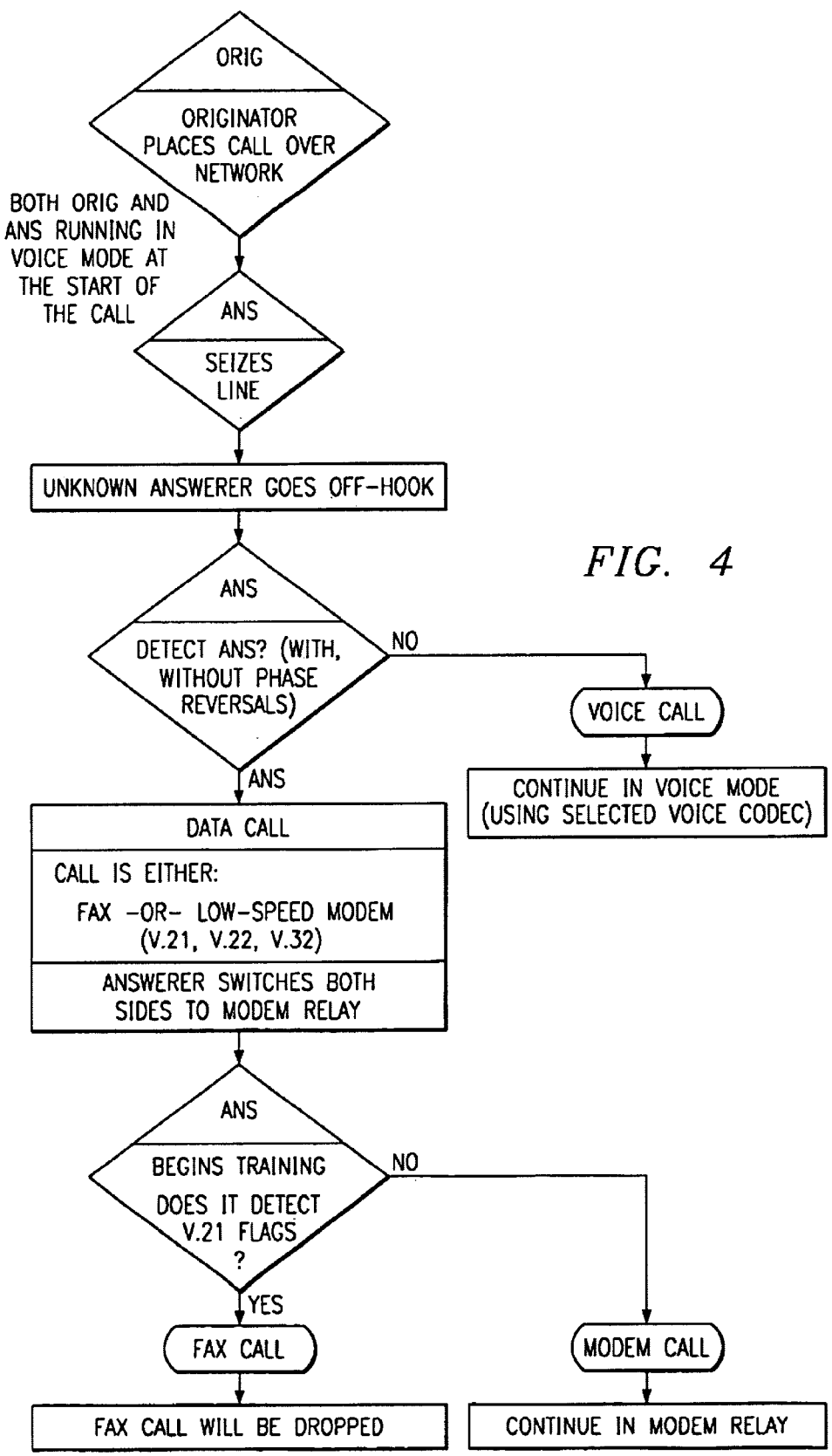
FIG. 4 is a logic diagram illustrating an exemplary logic structure for modem identification and modem relay activation.
Figure 5:
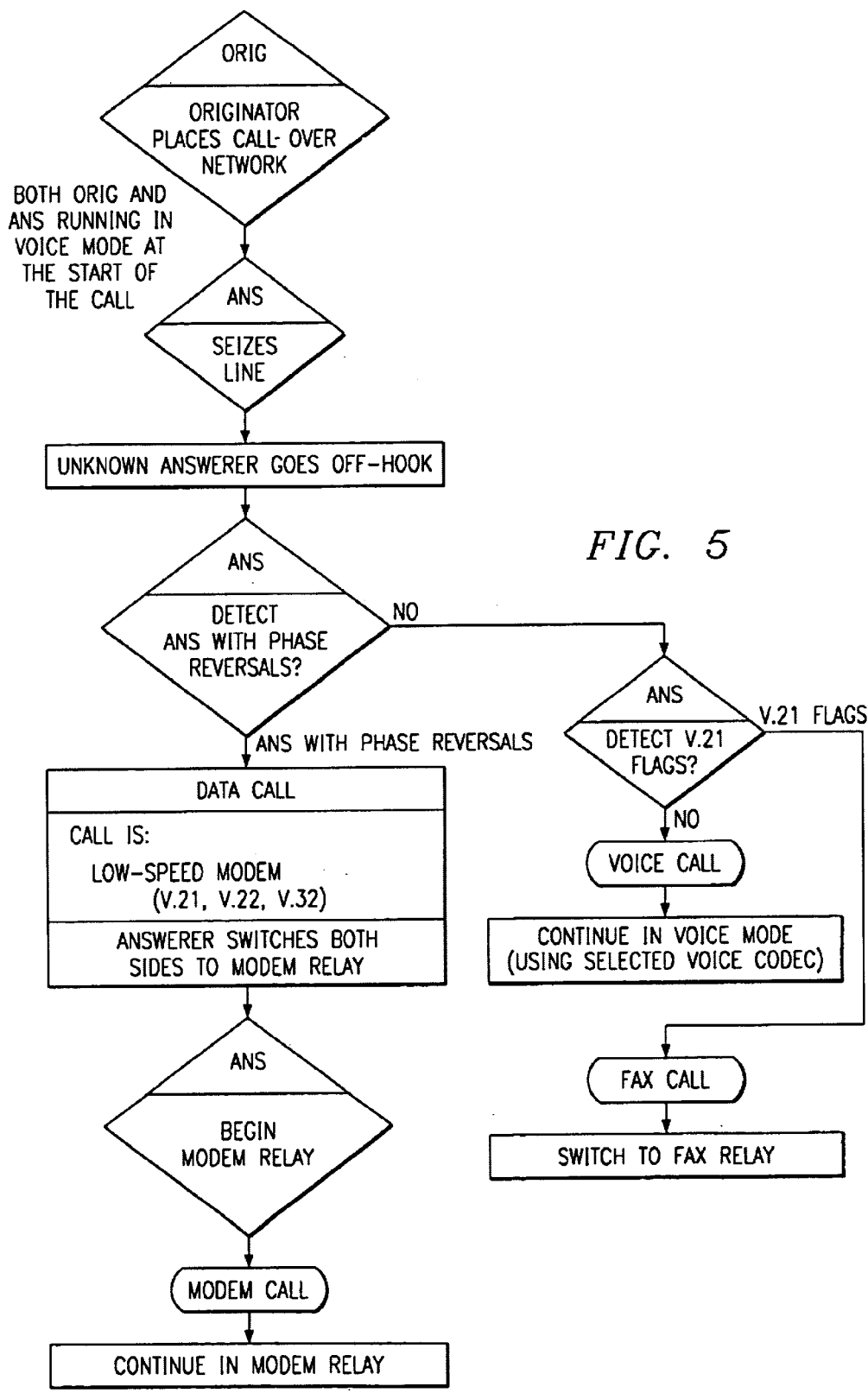
FIG. 5 is a logic diagram illustrating an alternative logic structure for modem identification and modem relay activation.

FIGS. 4 and 5 illustrate alternative embodiments for the decision tree for determining the processing sequence for new calls. Initially, the originator places a call were the packet network. Upon detecting a call, the answering gateway sees the line and goes off hook. The answering gateway then determines if a V.25 answer tone (ANS) with phase reversal, used by V.32, V.22 and V.21 modems, is present. When detected on the answering side, the gateway will switch to modem relay processing.

If phased reversal is not present, the ANS is the basic V.25 answer tone used by fax machines and V.32, V.22 and V.21 modems. When detected on the answering side, the gateway will switch to modem relay processing is the channel is preconfigured for modem relay and will not switch if the channel is potentially expecting fax transmissions. In the event that no ANS tone is detected, the answering gateway will then check for V.21 flags which is the queue to switch to fax relay processing. The if no events are detected, the gateway will to continue to process the call using voice codec.

Figure 6:
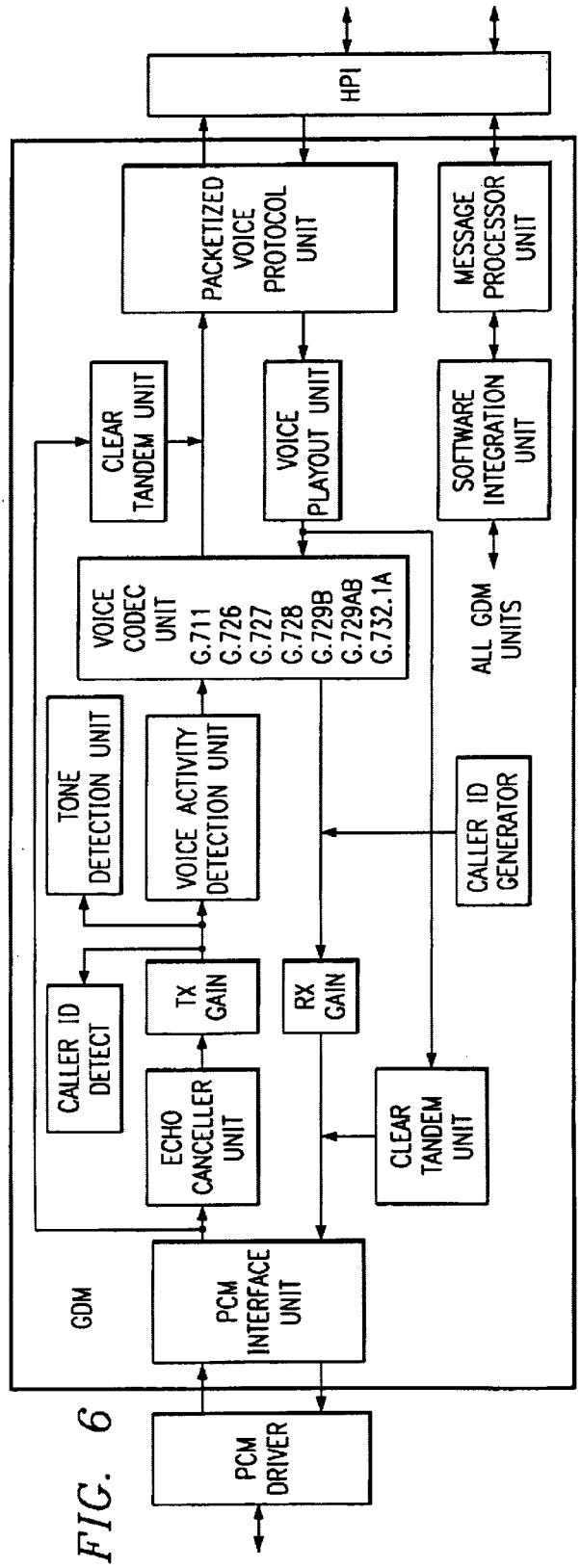
FIG. 6 is an exemplary implementation of a DSP voice channel configuration.
Figure 7:
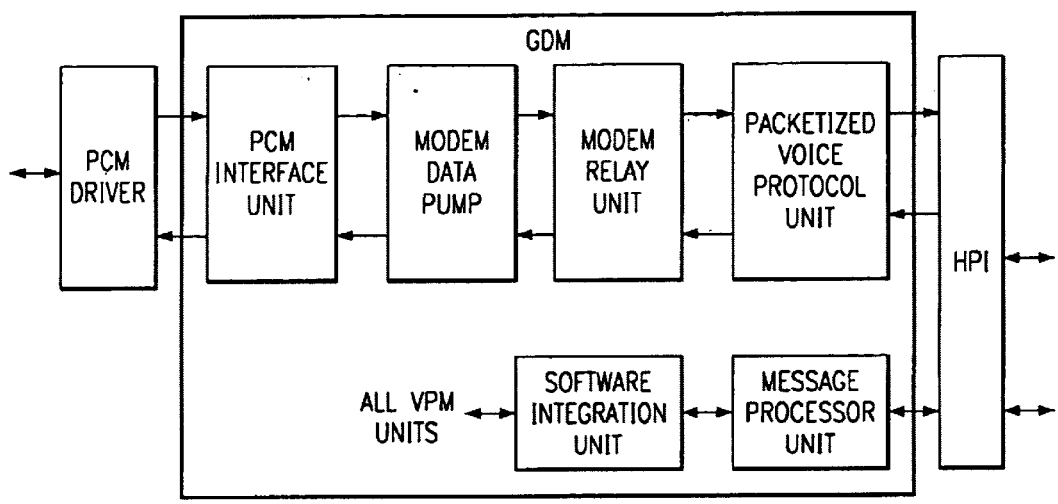
FIG. 7 is an exemplary modem relay DSP configuration.

Most of the functionality required to implement modem relay is located in the DSP software of the gateway. FIG. 6 illustrates a standard DSP voice channel configuration. When added, the modem relay unit, MRU, is added as a processing lock in the DSP software, FIG. 7. Modem relay channels are added to the DSP system integration unit SIU. Modem data pumps are added to the DSP software. Modem relay encapsulation and protocol functions are added to the MRU DSP software and MRU configuration and statistics commands are added to the SIU.

The microprocessor of the gateway also needs to be modified to accommodate the modem relay processing requirements. The microprocessor must respond to messages from the DSP that instruct the microprocessor to switch over from a voice channel to a modem relay channel in the DSP. The microprocessor must be able to respond to modem relay packets arriving from the network by switching a voice channel to a modem relay channel in the DSP. The microprocessor must allow the operator to configure and query statistics on a modem relay channels and must extend the NMM operator command set to accommodate commands needed to implement modem relay.

The SIU handles control and status messages from the microprocessor that reference to channel as it does for other types of DSP channels. Messages from the microprocessor that are unexpected or not supported in modem relay mode will be returned with an error code.

Figure 8:
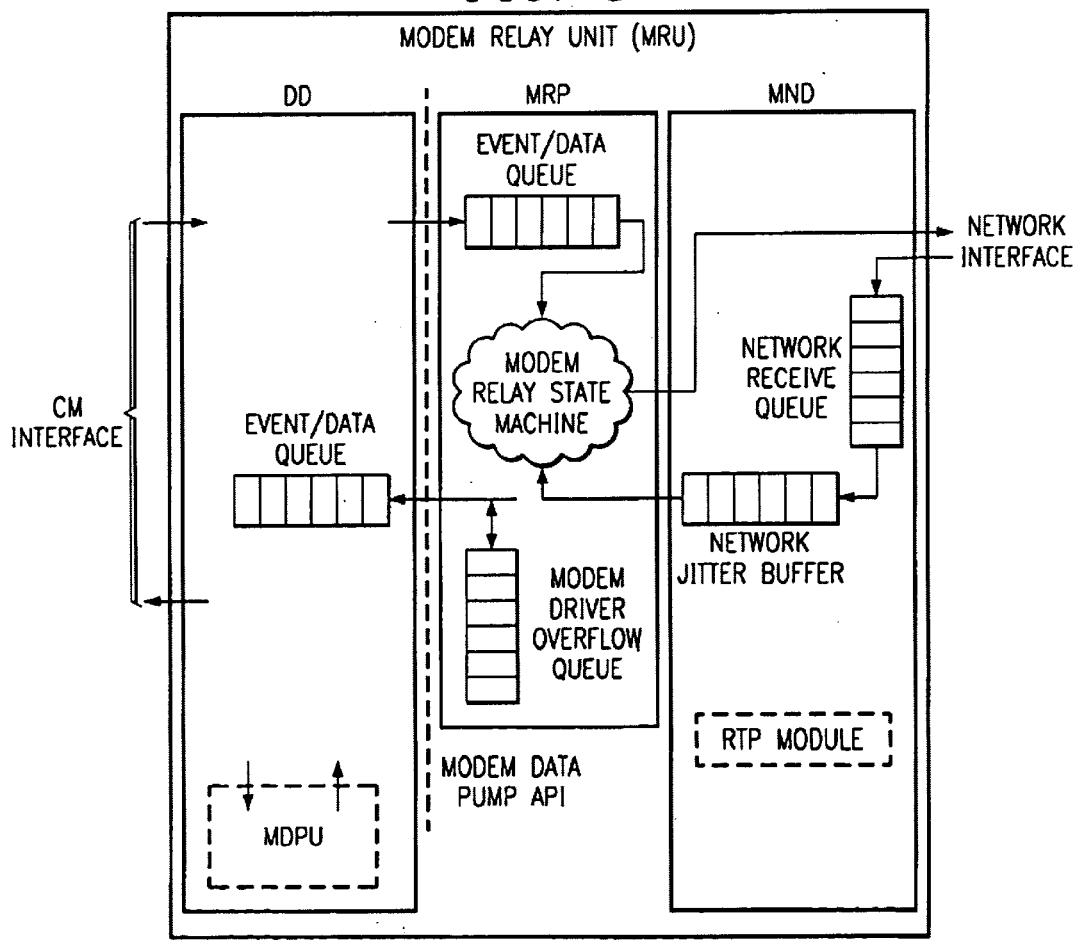
FIG. 8 is functional block diagram of an exemplary modem relay unit.

Within the MRU, FIG. 8, is the functional software for modem relay. The structure of the MRU includes a modem driver connected to the PCM interface, a modem relay protocol unit and a modem network driver which connects to the network interface. The modem driver provides the interface between the PCM interrupt routine and the modem data pump, which performs the physical modulation and the modulation functions of the current modem. The modem relay protocol module tracks the modems control and state machine functions and provides both data and messaging queues and overflow buffers. It also formats the modem data and signals into the proprietary modem relay protocol. The modem network driver performs the RTP encapsulation functions to implement the modem relay protocol containing signaling messages and data. It also provides a jitter offer to compensate for network delays.

Figure 9:
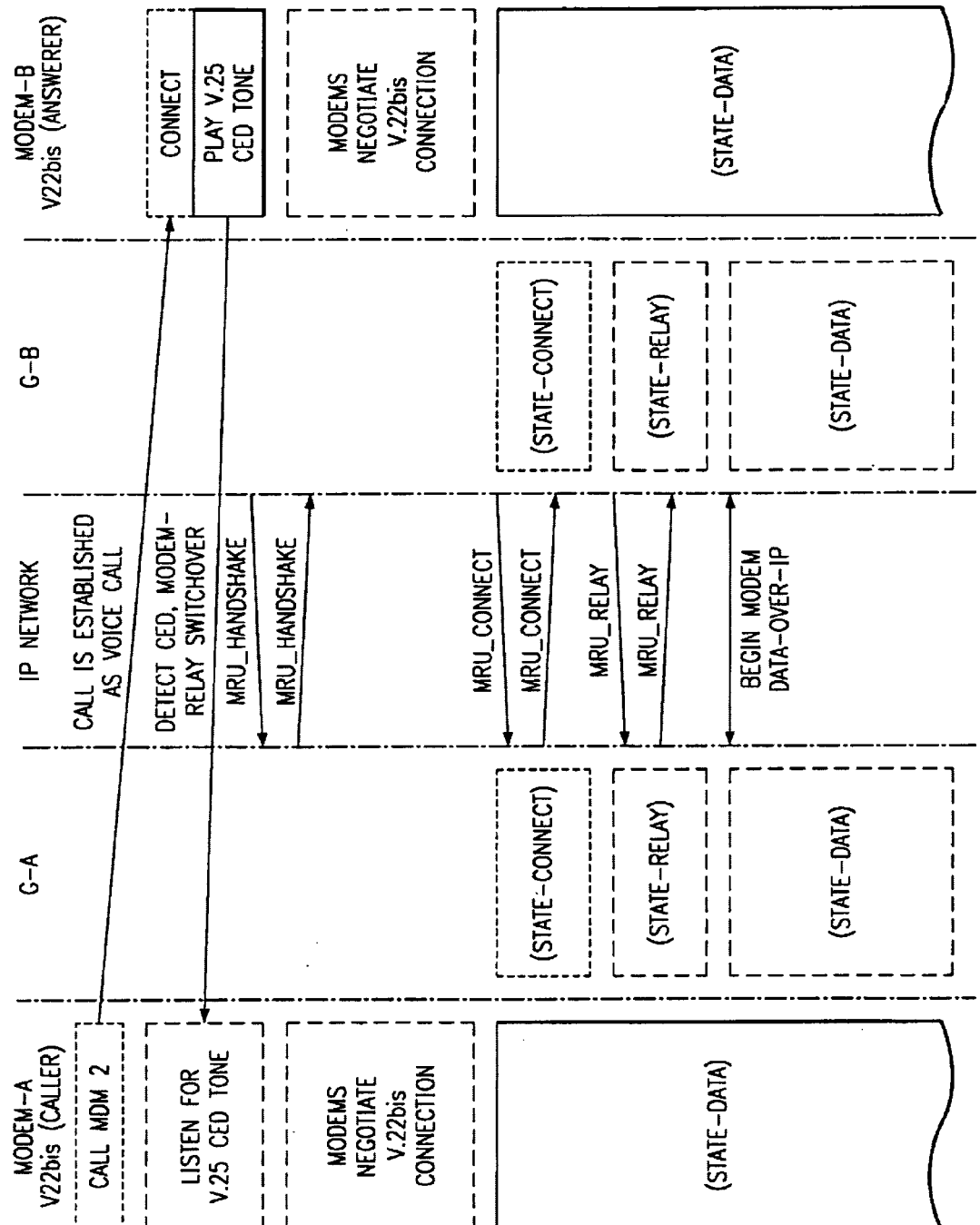
FIG. 9 is a connection ladder diagram illustrating the establishment and negotiation of a connection using V22 bis modems.

The establishment and negotiation of a connection using V.22 bis modems is illustrated in the connection ladder diagram of FIG. 9. The modems will establish and negotiate a connection between the two gateways using the gateway communication messages to coordinate the modem sessions. As illustrated, the call is initially established as a voice call until the tones to establish modem relay are detected. The modem relay units exchanged a handshake, and appropriate connection is negotiated the modem relay units contact and then establish relay states for beginning the modem data over IP communication.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A system for transmitting data between a first modem and a second modem across a packet network with reduced bandwidth and improved resistance to network packet loss, comprising:

a first processor for connection between said first modem and a first side of said packet network for:
  providing a local interface to said first modem;
  demodulating a full duplex data stream from said first modem into bits;
  packetizing the bits into packets for transport over said packet network; and
  remodulating said full duplex data stream from a remote end, and
a second processor for connection between said second modem and a second side of said packet network for:
  providing a local interface to said second modem;
  demodulating the full duplex data stream from said second modem into bits;
  packetizing the bits into packets for transport over said packet network; and
  remodulating said full duplex data stream from said first end side,
    wherein said packets include both new and redundant data which may be read upon said network packet loss.

2. The system of claim 1, further comprising:
  means for establishing optimal modulation and rate parameters for communication between said first and second modems.

3. The system of claim 2, wherein said means for establishing optimal modulation and rate parameters includes the exchange of signaling messages to determine the best commonly supported data rate.

4. The system of claim 3, wherein said means for establishing optimal modulation and rate parameters further includes:
  means for independent connection of said first and second modems if no commonly supported data rate is determined.

5. In a system wherein an originating modem terminal equipment connects to a digital network via an originating modem relay unit and wherein a destination modem terminal equipment connects to said digital network via a destination modem relay unit, a method of providing modem communications comprising:
  said originating modem terminal equipment sending digital data to the said destination modem terminating equipment via the said originating modem relay unit and said destination modem relay unit;
  said originating modem relay unit sending said digital data to said destination modem relay unit; and
  while said destination modem relay unit is waiting for said digital data from said originating modem terminating equipment, said destination modem relay unit maintaining communication with said destination modem terminating equipment to prevent protocol timeouts of said destination modem terminating equipment.

6. The system of claim 5, wherein each of said originating and said destination modem relay units include:
  a modem driver connected to a modulated interface,
  a modem network driver connected to said digital network, and
  a modem relay protocol unit, connected between said modem driver and said modem network driver, tracks modem control and state machine functions and provides modem data.

7. In a system wherein an originating modem terminal equipment connects to a digital network via an originating modem relay unit and wherein a destination modem terminating equipment connects to said digital network via a destination modem relay unit, a method of receiving a modem communication from said destination modem relay unit comprising:
  receiving digital data from the originating modem terminating equipment; and
  while waiting for said digital data from said originating modem terminating equipment, maintaining communication with said destination modem terminating equipment to prevent protocol timeouts of said destination modem terminating equipment.

8. A method of receiving a modem communication at a destination modem terminal equipment from an originating modem terminating equipment via a digital network, wherein the destination modem terminating equipment connects to said digital network via a destination modem relay unit, said method comprising:
  receiving, by said destination modem relay unit, digital data from said originating modem terminating equipment; and
  while waiting for said digital data from said originating modem terminating equipment, maintaining communication with said destination modem terminating equipment to prevent protocol timeouts of said destination modem terminating equipment.

9. The method of claim 8 wherein said digital network comprises one of an unknown and unpredictable delay.

10. A method for transmitting data between a first modem and a second modem across a packet network with reduced bandwidth and improved resistance to network packet loss, comprising:
  receiving a modem signal having a control portion and a data portion from said first modem;
  separating said control portion and said data portion;
  providing a control signal to said first modem at a local interface; and
  packetizing said data portion into packets for transmission over said packet network to a second modem,
  wherein said packets include both new and redundant data which may be read upon said network packet loss.

11. The method of claim 10, further comprising:
  establishing optimal modulation and rate parameters for communication between said first and second modems.

12. The method of claim 10, further including:
  exchanging signaling messages to determine a best commonly supported data rate.

13. The method of claim 12, further including:
  determining when no said commonly supported data rate is available; and
  independently connecting said first and second modems if no said commonly supported data rate is determined.

14. The method of claim 10, wherein said providing both new and redundant data in a packet follows a first series of data packets in which at least one of said first series of data packets is lost across said packet network.

15. The method of claim 14, wherein:
  said providing both new and redundant data is delayed by a predetermined number of data packets following said first series of data packets.

16. The method of claim 15, wherein said data packets comprise digital modem data.

17. The method of claim 15, wherein said predetermined number of data packets is selected to accommodate expected packet loss and to provide acceptable delay.

* * * * *